US007631076B2

(12) United States Patent
Cannon et al.

(10) Patent No.: US 7,631,076 B2
(45) Date of Patent: Dec. 8, 2009

(54) APPARATUS, SYSTEM, AND METHOD FOR ADAPTIVE POLLING OF MONITORED SYSTEMS

(75) Inventors: David Maxwell Cannon, Tucson, AZ (US); Thomas Franklin Ramke, Jr., Vonore, TN (US)

(73) Assignee: International Business Machines Corporation, Armonk, NY (US)

( * ) Notice: Subject to any disclaimer, the term of this patent is extended or adjusted under 35 U.S.C. 154(b) by 1227 days.

(21) Appl. No.: 10/801,255

(22) Filed: Mar. 16, 2004

(65) Prior Publication Data

US 2005/0210128 A1 Sep. 22, 2005

(51) Int. Cl.
G06F 15/173 (2006.01)
H04N 7/16 (2006.01)
H04L 12/42 (2006.01)

(52) U.S. Cl. .................. 709/225; 725/25; 370/449

(58) Field of Classification Search ................. 709/225; 711/25, 28, 44–48, 109, 220; 725/16; 370/449
See application file for complete search history.

(56) References Cited

U.S. PATENT DOCUMENTS

| 4,598,363 | A | 7/1986 | Clark et al. | 364/200 |
|---|---|---|---|---|
| 5,566,351 | A | 10/1996 | Crittenden et al. | 395/867 |
| 5,963,884 | A * | 10/1999 | Billington et al. | 702/56 |
| 6,173,323 | B1 | 1/2001 | Moghe | 709/224 |
| 6,281,987 | B1 * | 8/2001 | Yoshida | 358/434 |
| 6,353,869 | B1 | 3/2002 | Ofer et al. | 710/200 |
| 6,621,827 | B1 | 9/2003 | Rezvani et al. | 370/449 |
| 7,398,291 | B2 * | 7/2008 | Osias | 709/203 |
| 2002/0039369 | A1 | 4/2002 | Koo | 370/449 |
| 2003/0009552 | A1 | 1/2003 | Benfield et al. | 709/224 |
| 2003/0097417 | A1 | 5/2003 | Lin et al. | 709/213 |
| 2003/0140092 | A1 | 7/2003 | Caruso et al. | 709/203 |

FOREIGN PATENT DOCUMENTS

JP 08-180287 7/1996

OTHER PUBLICATIONS

"Adaptive Polling Algorithm for Monitoring Multimedia Devices", IBM TDB, Sep. 1993, vol. 36, No. 09A, pp. 83-84.
"Adaptive Polling Algorithm for PCs Connected to AS/400 ASCII Work Station Controller", IBM TDB, Mar. 1991, vol. 33, No. 10A, pp. 89-91.

* cited by examiner

Primary Examiner—Krisna Lim
(74) Attorney, Agent, or Firm—Kunzler & McKenzie

(57) ABSTRACT

An apparatus for adaptive polling of a monitored system includes a poll receiving module configured to receive a polling signal from a polling system, an event prediction module configured to predict when an operation-related event of a monitored operation will occur in the monitored system, a next polling time determination module configured to determine a next polling time based on the prediction of when the operation-related event will occur in the monitored system and a polling response module configured to communicate the next polling time and monitored system operation information to the polling system. In one embodiment, the next polling time determination module is further configured to determine the next polling time based on the prediction of when the operation-related event will occur and on network traffic.

20 Claims, 6 Drawing Sheets

APPARATUS, SYSTEM, AND METHOD FOR ADAPTIVE POLLING OF MONITORED SYSTEMS

BACKGROUND OF THE INVENTION

1. Field of the Invention

The invention relates to monitoring of operations on a computer and more particularly relates to adaptive monitoring of operations on a computer.

2. Description of the Related Art

The use of client-server systems has risen dramatically in recent years. Systems typically include client computers in communication with one or more servers through a computer network. Other devices such as printers, scanners, and storage server systems may also be accessed from the network. A critical process for a client-server system is asynchronous polling of a monitored system. Typically, the client nodes poll the server at regular intervals and the server returns information for each operation such as the current status of the operation, number of items that have been processed, percentage completion, estimated remaining time to completion, etc. The polling and the monitored systems may take many forms. For example the polling system maybe a client computer or a server. The monitored system may be a server or a data storage system.

Typically, the polling system determines the polling interval. A regular polling interval may be too infrequent so that there is an unacceptable delay before the polling system detects a status change for the operation being monitored. If polling is done frequently, operation completion is detected quickly, but network traffic is increased and the system is slowed due to resources required to respond to the frequent polling requests.

An adaptive polling method is a more efficient use of computer resources. An adaptive polling method could slow polling during periods of inactivity and increase polling near operation completion and other times of computer activity. Typical adaptive polling methods have increased computer efficiency, but are inadequate since they base the polling interval change on server activity.

In periods of inactivity, a polling interval may be long. Once server activity increases, the polling interval decreases. Once server activity is reduced, the polling interval is extended. The drawback of this type of system is that the polling interval adjustment is always lagging server activity since the polling interval is not changed until after the activity level of the server has changed for a time. If the polling time is set to be a long period, and a server operation completes or reaches a next phase, the polling system continues to wait until the next scheduled polling time and cannot act any sooner since the polling system does not yet know of the status change. Conversely, if a server event occurs and the server once again goes into a period of inactivity, the polling system continues to poll frequently for a time until enough of a trend is identified to slow the polling. This wastes computer resources.

What is needed is a process, apparatus, and system that adaptively monitors remote operations and adjusts the polling interval based on a signal sent from the remote operation. It would be a further advantage if, such a process, apparatus, and system would respond to a polling request by estimating the time of completion of an operation-related event and then sending to the polling system a next polling time based on the estimated operation-related event as well as any information being requested by the polling system.

SUMMARY OF THE INVENTION

The present invention has been developed in response to the present state of the art, and in particular, in response to the problems and needs in the art that have not yet been fully solved by currently available adaptive polling methods. Accordingly, the present invention has been developed to provide a process, apparatus, and system for adaptive polling that overcomes many or all of the above-discussed shortcomings in the art.

The apparatus for adaptive polling is provided with a logic unit containing a plurality of modules configured to functionally execute the necessary steps of receiving a polling request, predicting when an operation-related event occurs, determining a next polling time, and sending the next polling time along with information requested to the polling system. These modules in the described embodiments include a poll receiving module configured to receive a polling signal from a polling system, an event prediction module configured to predict when an operation-related event will occur in the monitored system, a next polling time determination module configured to determine a next polling time based on the prediction of when an operation-related event will occur in the monitored system, and a polling response module configured to communicate the next polling time and monitored system operation information to the polling system.

In one embodiment, the next polling time determination module determines the next polling time based on both the prediction of when an operation-related event will occur and network traffic. In another embodiment, the next polling time determination module determines the next polling time based on both the prediction of when an operation-related event will occur and if another operation is executing with a higher priority than the operation being monitored. The next polling time determination module may be further configured to adjust the next polling time on any combination of network traffic, server workload, or higher priority operations. In yet another embodiment, the monitored system retains a status of the monitored operation event after completion of the operation for a period of time to allow one or more polling systems to send a polling request and receive the final status of the monitored operation.

The apparatus, in one embodiment, further includes a polling adjustment module in the polling system that adjusts the next polling time. In a further embodiment, the polling adjustment module adjusts the next polling time based on the presence of a user input to the polling system.

In one embodiment, the polling system comprises a client system and the poll receiving module, event prediction module, next polling time determination module, and polling response module are on a server. In yet another embodiment, the poll receiving module, event prediction module, next polling time determination module, and polling response module are on a data storage system.

A system of the present invention is also presented for adaptive polling of remote systems. The system may be embodied by a polling system and a monitored system. In particular, the system, in one embodiment, includes a polling module in the polling system that sends a polling signal to the monitored system, a poll receiving module in the monitored system that receives the polling signal from the polling module, an event prediction module that predicts when an operation-related event will occur in the monitored system, a next polling time determination module that determines a next polling time based on the prediction of when an operation-related event will occur in the monitored system, a polling response module in the monitored system configured to communicate the next polling time and monitored system status information to the polling module, and a communications network connecting the polling system with the monitored system.

The system may further include a polling adjustment module that adjusts the next polling time. In one embodiment, the polling adjustment module adjusts the next polling time based on the presence of a user input to the polling system. In another embodiment, the next polling time determination module determines the next polling time based on both the prediction of when an operation-related event will occur and network traffic. In yet another embodiment, the next polling time determination module determines the next polling time based on both the prediction of when an operation-related event will occur and if another operation is executing with a higher priority than the operation being monitored.

A computer readable storage medium of the present invention is also presented to carry out a method for adaptive polling of a monitored system. The computer readable storage medium in the disclosed embodiments includes computer code for conducting a process that carries out the functions presented above with respect to the operation of the described apparatus and system. In one embodiment, the process includes receiving a polling signal from a polling system, predicting when an operation-related event will occur in the monitored system, determining a next polling time based on the prediction of when an operation-related event will occur in the monitored system, and communicating the next polling time and monitored system operation information to the polling module. The process also may include adjusting the next polling time. In one embodiment, adjusting the next polling time is based on the presence of user input to the polling system.

In another embodiment, the method includes determining the next polling time based on the prediction of when an operation-related event will occur and on network traffic. In yet another embodiment, the method further comprises determining the next polling time based on the prediction of when an operation-related event will occur and if another operation is executing with a higher priority than the operation being monitored. In another embodiment, the method retains a status of the monitored operation after completion of the operation for a period of time to allow one or more polling systems to send a polling request and receive the final status of the monitored operation.

The system may be a client-server system or a computer network connected to a storage server through a storage area network. One skilled in the art would recognize other systems that include a polling system and a monitored system.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
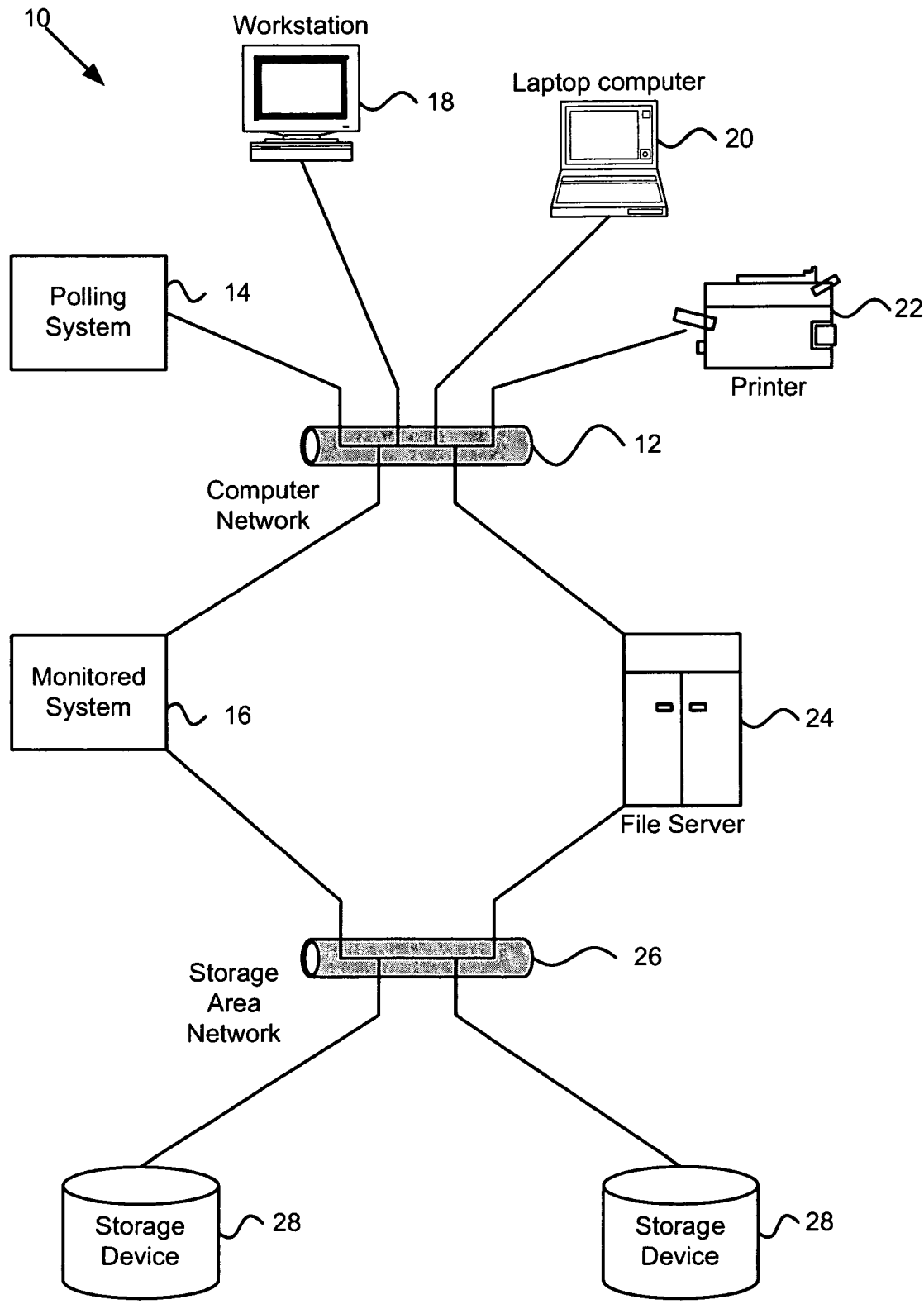
FIG. 1 is a schematic block diagram illustrating one embodiment of a system for adaptive polling of a monitored system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media. A computer readable storage medium may take any form capable of storing machine-readable instructions executable on a digital processing apparatus.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 depicts a computer system 10 given by way of example of a system suitable for adaptive polling of a monitored system under the present invention. A computer network 12 is connected to a polling system 14. The polling system 14 may take on any number of forms such as a client computer, a server, or any other device for which polling to determine status information of another system or device is useful or required. The computer network 12 is also connected to a monitored system 16. The monitored system 16 may be a server, a data storage device, a computer, or any other device that has information and data that another polling system may desire or require. Other embodiments may include any number of polling systems 14 configured to monitor operations on a monitored system 16. The computer network 12 may also connect to a workstation 18, a laptop computer 20, a printer 22, a file server 24, and any other device found in a computer system. The computer system 10 may also include a storage area network 26 connecting data storage devices 28 to the file server 24, monitored system 16, or other typical devices connected to a storage area network. Those skilled in the art will recognize other system configurations that include a polling system and a monitored system that are incorporated into computers, file servers, or other similar devices and systems.

Figure 2:
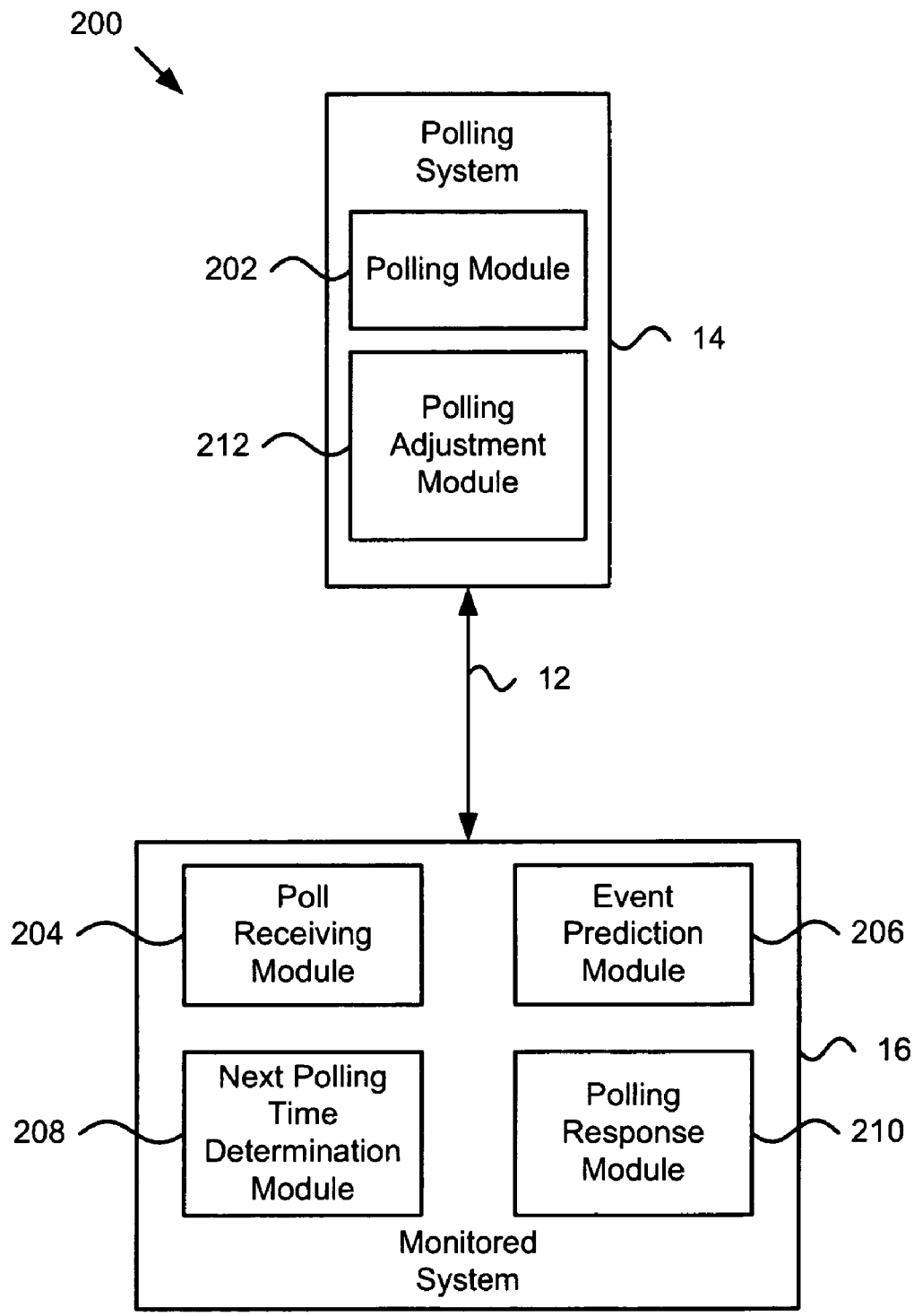
FIG. 2 is a more detailed schematic block diagram illustrating one embodiment of the present invention.

FIG. 2 is a more detailed embodiment of a computer system 200 for adaptive polling of monitored systems. The computer network 12 is connected to a polling system 14 and a monitored system 16. The polling system 14 in one embodiment, includes a polling module 202 configured to send a polling signal. The polling signal is configured to request status information from a monitored system 16.

The monitored system 16 includes a poll receiving module 204 configured to receive the polling signal from the polling system 14, an event prediction module 206 configured to predict when an operation-related event will occur in the monitored system, a next polling time determination module 208 configured to determine a next polling time based on the prediction of when an operation-related event will occur in the monitored system, and a polling response module 210 configured to send a next polling time along with status information of the operation-related event. The information sent by the polling response module 210 may also include any other information relevant to a computer system and requested by the polling system. Those skilled in the art will recognize other information that may be sent in response to a polling signal.

In another embodiment, the next polling time determination module 208 in the monitored system 16 is configured to determine if the network or monitored system 16 is busy and to adjust the next polling time accordingly. The next polling time maybe altered by factors in the monitored system 16 such as execution of a higher priority operation different than the operation being monitored, server workload, high network traffic, or any other factor relevant to when a next polling time might occur. Typically, these factors would increase the next polling time, but the next polling time may be shortened or stay the same.

In yet another embodiment, the polling system 14 includes a polling adjustment module 212 in the polling system 14 configured to monitor factors such as user input, a critical need for a polling response, or other parameters that may be factors in adjusting the next polling time. If the polling adjustment module 212 determines that parameters call for a reduced polling time, the next polling time is shortened. The polling adjustment module 212 may also increase the next polling time, or determine that the next polling time from the polling response module 210 does not need to be adjusted. Those skilled in the art will recognize other embodiments including more than one polling system 14, which may be running concurrently, seeking information from the monitored system 16.

Figure 3:
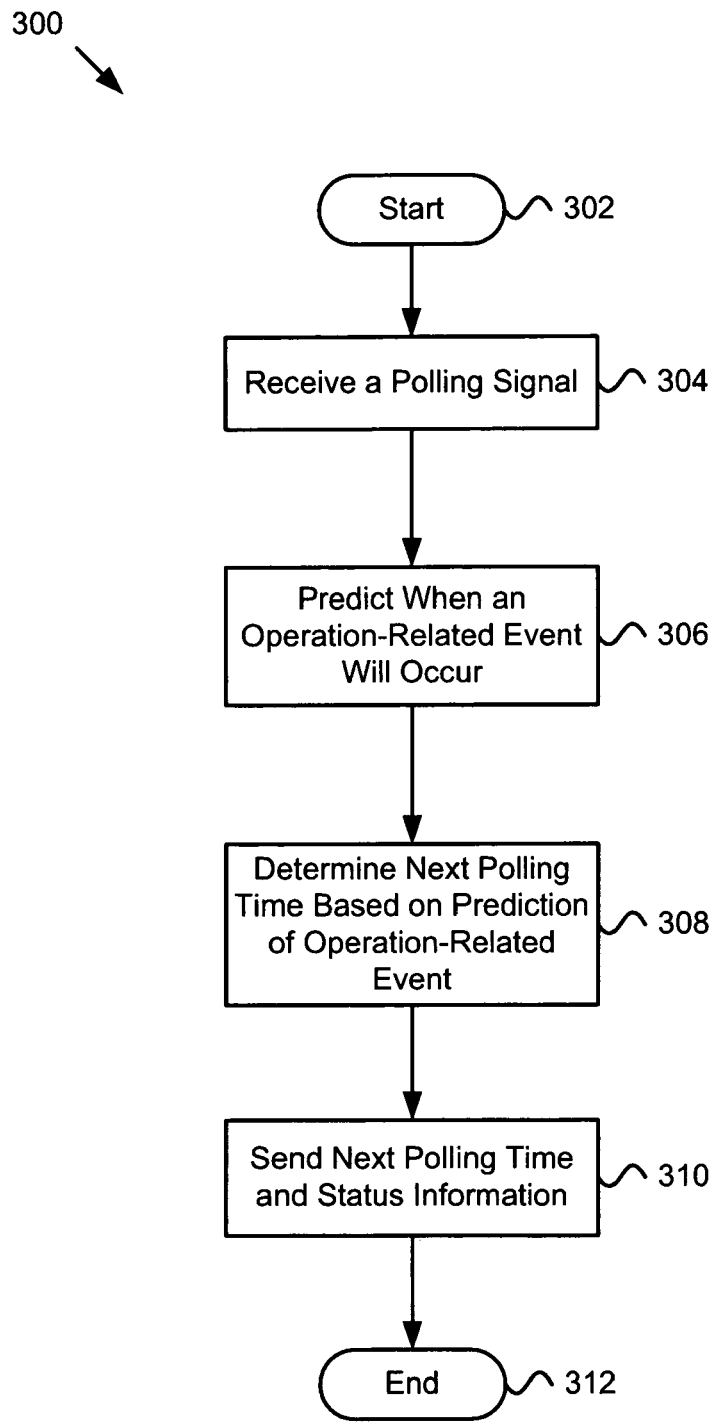
FIG. 3 is a schematic flow chart diagram illustrating one embodiment of a monitored system in accordance with the present invention.

FIG. 3 is a schematic flow chart diagram illustrating one embodiment of a method 300 for adaptive polling of a monitored system that illustrates operation in the monitored system 16. The method 300 starts 302 when the poll receiving module 204 receives 304 a polling signal from the polling system 14. The event prediction module 206 then predicts 306 when an operation-related event will occur. Predicting when an operation-related event will occur may comprise estimating when an operation is completed, reaches a new phase, changes state, or any other indicator of when polling may next be performed. Those skilled in the art will recognize other embodiments of determining when an operation-related event occurs, completes, partially completes, reaches a new phase, changes state, or any other measure that would provide a suitable time when polling would next be desired.

The next polling time determination module 208 then determines 308 the next polling time based on the prediction of when an operation-related event will occur. Typically, the next polling time would be some value less than when the next operation-related event occurs. In one embodiment, the polling may be done every 30 seconds until an operation-related event is estimated to be at least 95% complete, and then the polling is done every 3 seconds. Those skilled in the art will recognize other methods of determining the next polling time based on the particular event being monitored.

Once the next polling time is determined, the polling response module 210 sends 310 the next polling time to the polling system 14 along with other information requested by the polling system and the method ends 312. The monitored system 16 then waits for a polling signal and the process 300 repeats. The monitored system 16 retains the status of the monitored operation after completion of the operation for a period of time to allow the poll response module 204 to receive a polling signal and the polling response module 210 to send the final operation status to the polling system 14. The final status is maintained so that after an operation completes, the information will not be lost until the final status is sent to the polling system. Other embodiments may include retaining an operation-related event status, a partially completed operation status or other useful information. In yet another embodiment, more than one polling system 14 is present and requesting operation status.

Figure 4:
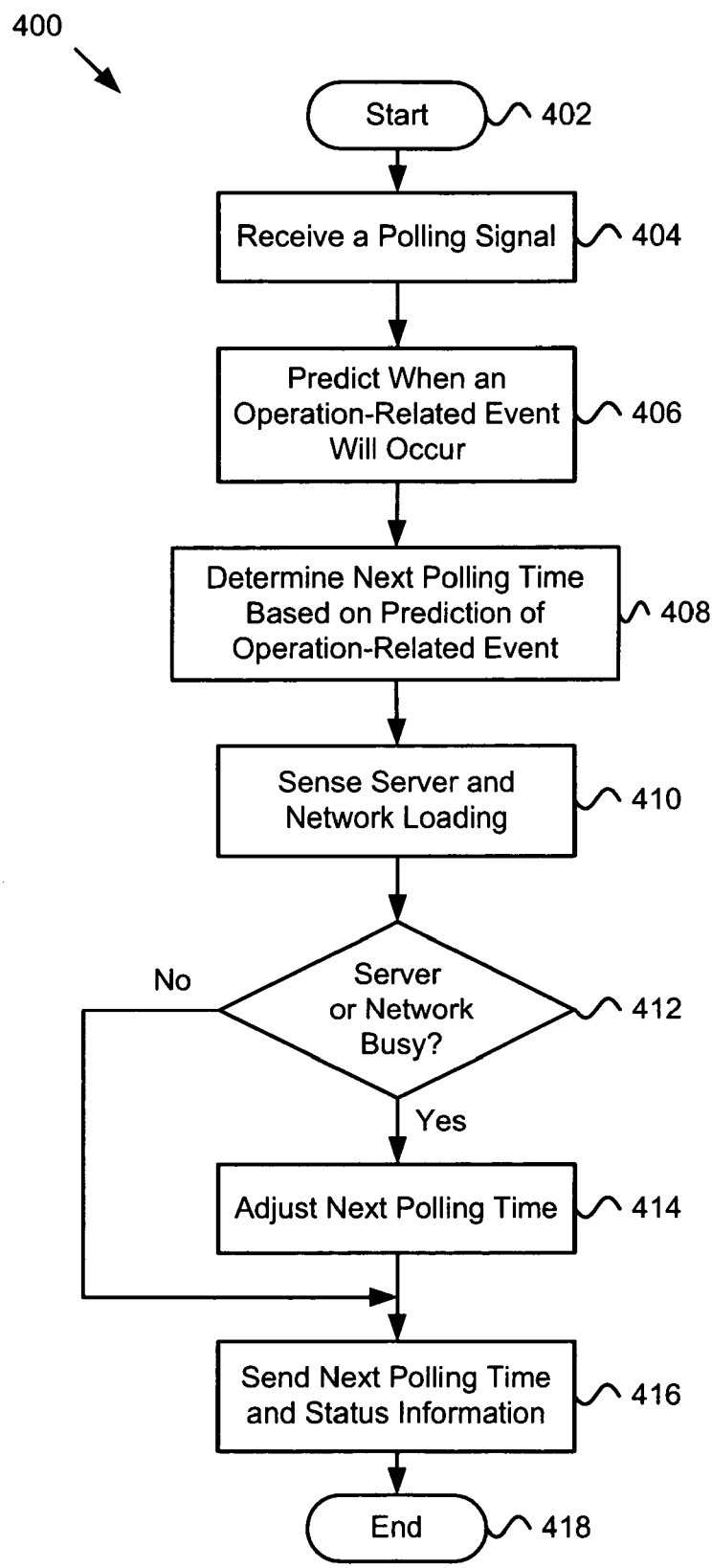
FIG. 4 is a more detailed schematic flow chart diagram illustrating one embodiment of a monitored system in accordance with the present invention.

FIG. 4 is a schematic flow chart diagram illustrating an embodiment of a method 400 for adaptive polling of a monitored system illustrated from the point of view of the monitored system 16. The method 400 starts 402 when the poll receiving module 204 receives 404 a polling signal from the polling system 14. The event prediction module 206 then predicts 406 when an operation-related event will occur. The next polling time determination module 208 then determines 408 the next polling time based on the prediction of when an operation-related event will occur. The next polling time would typically be some value less than when the next operation-related event occurs. Again, those skilled in the art will recognize other methods for determining the next polling time based on the particular event being monitored.

In the present embodiment, the next polling time determination module 208 senses 410 server or network loading. If the server or network is busy 412, the next polling time determination module 208 then adjusts 414 the next polling time. High network traffic, work load of the monitored system, a higher priority operation than the operation being monitored, and other factors may be used to determine when the network, server, or any other device of the monitored system 16 is busy and when it is desirable to change the next polling time. Typically, the next polling time would be increased by such external factors, but the next polling time may be shortened or remain the same. If the network or server is determined not to be busy 412, the next polling time is not adjusted. The polling response module 210 then sends 416 the next polling time and other requested information to the polling system 14 and the method ends 418 and is ready for a next polling signal. The monitored system 16 retains the status of the monitored operation after completion of the operation for a period of time to allow the poll receiving module 204 to receive a polling signal and the poll response module 210 to send the final operation status to the polling system 14. In other embodiments, the method 400 retains an operation-related event status, a partially completed operation status or other useful information. In another embodiment, multiple polling systems 14 are present and requesting information from the monitored system 16.

Figure 5:
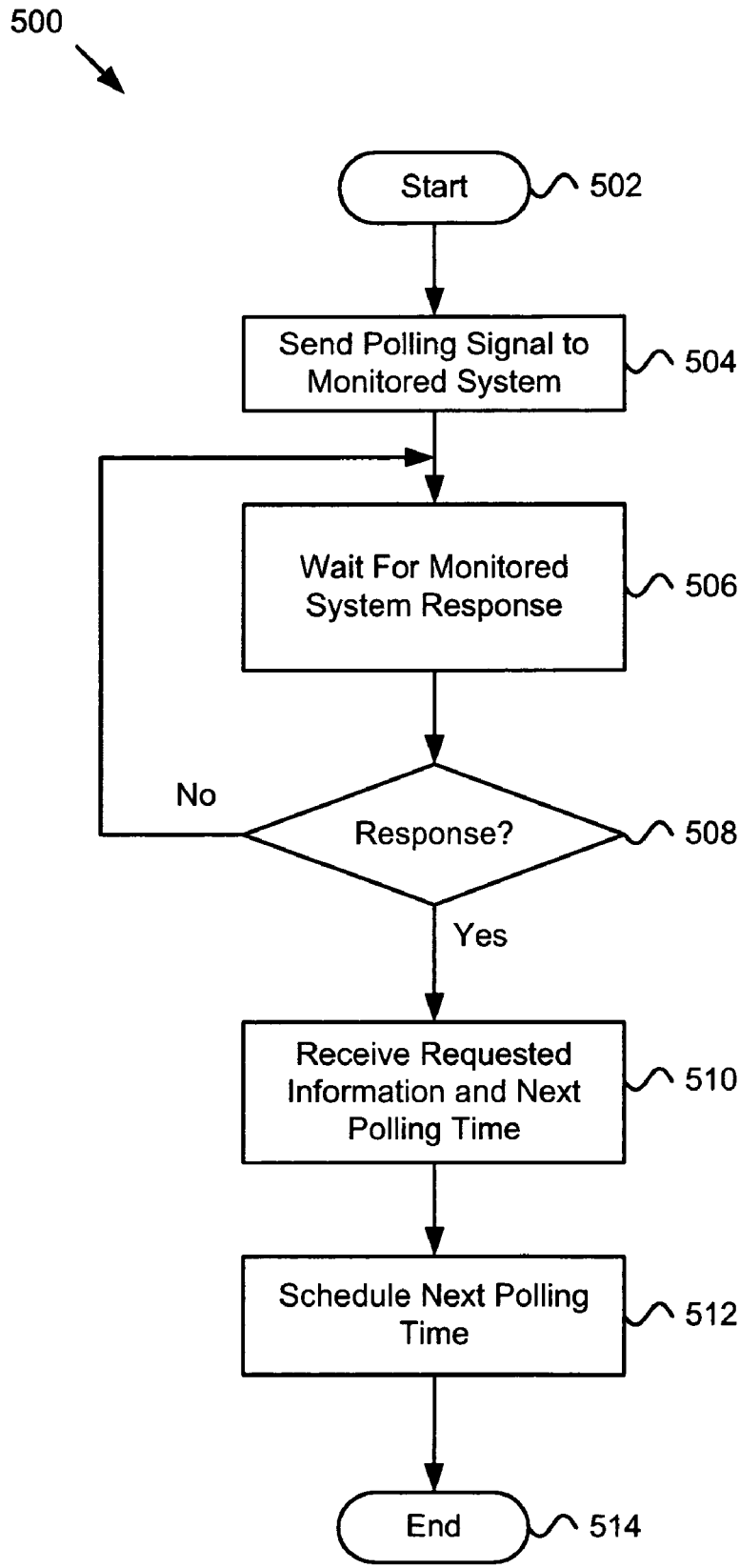
FIG. 5 is a schematic flow chart diagram illustrating one embodiment of a polling system in accordance with the present invention.

FIG. 5 is a schematic flow chart diagram illustrating one embodiment of a method 500 for adaptive polling of a monitored system illustrated from the point of view of a polling system 14. The method 500 starts 502 when the polling module 202 sends 504 a polling signal to the monitored system 16. The polling system 14 then waits 506 for a response from the monitored system 16. If the polling system 14 does not receive a response 508 from the monitored system 16, the polling system 14 continues to wait 506 for a response from the monitored system 16. If the monitored system 16 responds 508 to the polling system 14, the polling system 14 receives 510 information from the monitored system 16 along with a next polling time and schedules 512 a next time for polling based on the received next polling time and the method ends 514. When the polling system 14 reaches the next polling time, the method 500 repeats. If the operation has completed and no further polling is necessary or if the monitoring is terminated, the process 500 will not repeat.

Figure 6:
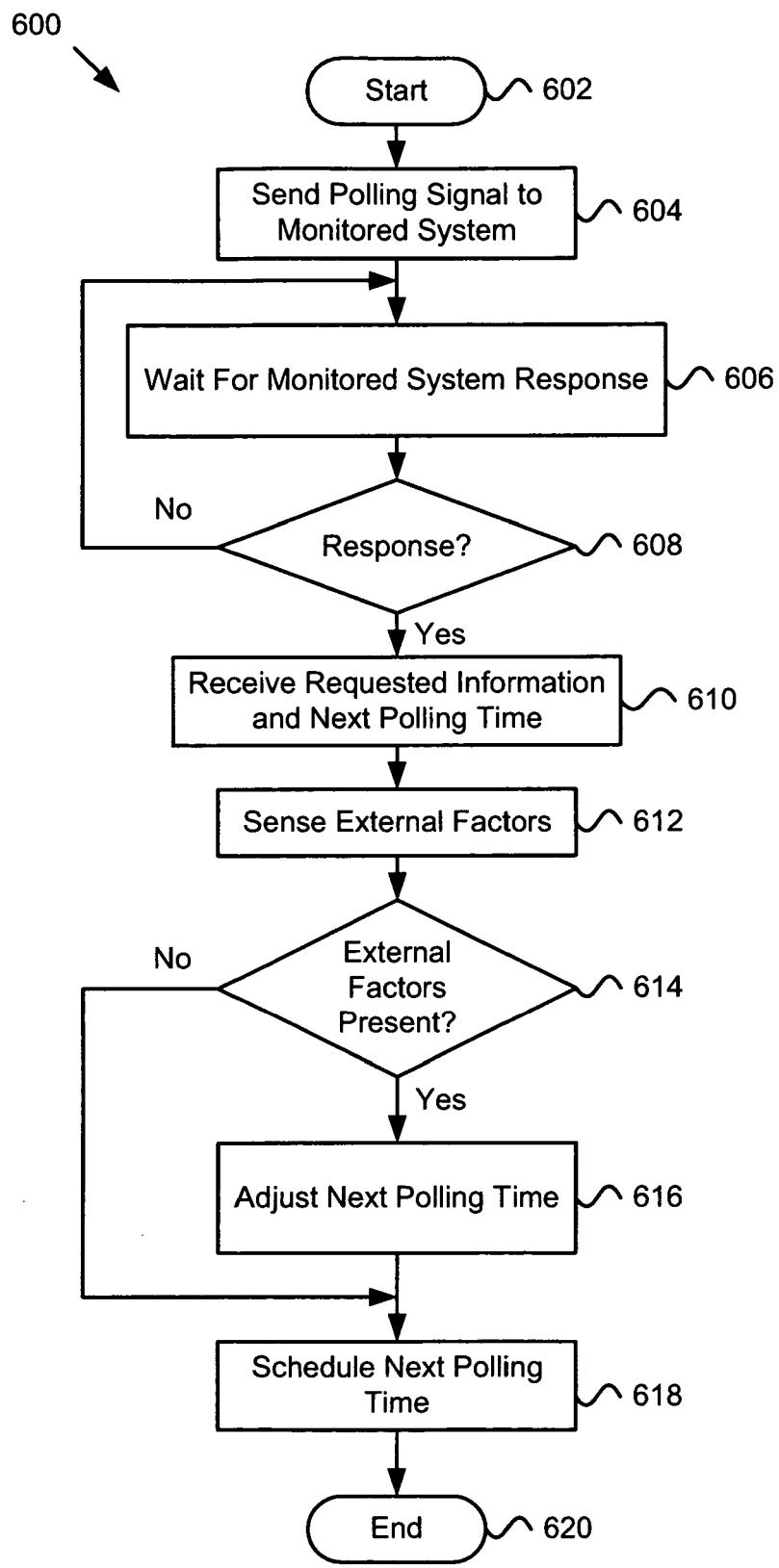
FIG. 6 is a more detailed schematic flow chart diagram illustrating one embodiment of a polling system in accordance with the present invention.

FIG. 6 is a schematic flow chart diagram illustrating an alternate embodiment of a method 600 for adaptive polling of a monitored system illustrated from the point of view of a polling system 14. The method 600 starts 602 when the polling module 202 sends 604 a polling signal to the monitored system 16. The polling system 14 then waits 606 for the monitored system 16 to respond. If the polling system 14 does not receive a response 608 from the monitored system 16, the polling system 14 continues to wait 606 for a response from the monitored system 16. If the monitored system 16 responds 608 to the polling signal, the polling system 14 receives 610 the requested information from the monitored system 16 along with a next polling time.

In the present method 600, the polling adjustment module 212 senses 612 external factors such as user input, a critical need for a polling response, or other parameters that may be factors in shortening or otherwise adjusting the next polling time. If there are external factors present 614, the polling adjustment module 212 adjusts 616 the next polling time received from the monitored system 16. Otherwise, the next polling time remains unchanged. The next polling time is typically shortened, but could be lengthened or remain unchanged. The polling system 14 then schedules 618 the next time for polling based on the adjusted next polling time and the method ends 620. When the polling system 14 reaches the next polling time, the method 600 repeats. If the operation has completed and no further polling is necessary or if the monitoring is terminated, the process 500 will not repeat.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for adaptive polling of a monitored system, the apparatus comprising:
   a poll receiving module configured to receive a polling signal from a polling system, the polling signal comprising a request for information regarding a monitored operation being executed by the monitored system;
   an event prediction module configured to predict when an operation-related event of the monitored operation will occur in the monitored system before the operation-related event occurs;
   a next polling time determination module configured to determine a next polling time based on the prediction of when the operation-related event will occur in the monitored system before the operation-related event occurs; and
   a polling response module configured to communicate the next polling time and monitored system operation information to the polling system.

2. The apparatus of claim 1, wherein the next polling time determination module is further configured to determine the next polling time based on the prediction of when the operation-related event will occur based on network traffic.

3. The apparatus of claim 1, wherein the next polling time determination module is further configured to determine the next polling time based on the prediction of when the operation-related event will occur and if another operation is executing with a higher priority than the operation being monitored.

4. The apparatus of claim 1, wherein the monitored system retains a status of the monitored operation for a period of time after completion of the monitored operation.

5. The apparatus of claim 1, further comprising a polling adjustment module in the polling system configured to adjust the next polling time.

6. The apparatus of claim 1, further comprising a polling adjustment module configured to adjust the next polling time based on the presence of a user input to the polling system.

7. The apparatus of claim 1, wherein the polling system is a client system, and the poll receiving module, event prediction module, next polling time determination module and polling response module are on a server.

8. The apparatus of claim 1, wherein the polling system is a client system, and the poll receiving module, event prediction module, next polling time determination module and polling response module are on a data storage system.

9. A system for adaptive polling of a monitored system, the system comprising:
   a polling system containing a polling module configured to poll a monitored system;
   a poll receiving module in the monitored system configured to receive a polling signal from the polling module, the polling signal comprising a request for information regarding a monitored operation being executed by the monitored system;
   an event prediction module configured to predict when an operation-related event of the monitored operation will occur in the monitored system before the operation-related event occurs;
   a next polling time determination module configured to determine a next polling time based on the prediction of when the operation-related event will occur in the monitored system before the operation-related event occurs;
   a polling response module configured to communicate the next polling time and monitored system status information to the polling module; and
   a communications network connecting the polling system with the monitored system.

10. The system of claim 9 further comprising a polling adjustment module configured to adjust the next polling time.

11. The system of claim 9 wherein, the polling adjustment module is configured to adjust the next polling time based on the presence of a user input to the polling system.

12. The system of claim 9, wherein the next polling time determination module is further configured to determine the next polling time based on the prediction of when an operation-related event will occur and on network traffic.

13. The system of claim 9, wherein the next polling time determination module is further configured to determine the next polling time based on the prediction of when the operation-related event will occur and if another operation is executing with a higher priority than the operation being monitored.

14. A computer readable storage medium comprising computer readable code configured to carry out a method for adaptive polling of a monitored system, the method comprising:
   receiving a polling signal from a polling system, the polling signal comprising a request for information regarding a monitored operation being executed by the monitored system;
   predicting when an operation-related event of the monitored operation will occur in the monitored system before the operation-related event occurs;
   determining a next polling time based on the prediction of when the operation-related event will occur in the monitored system before the operation-related event occurs; and
   communicating the next polling time and monitored system operation information to the polling module.

15. The computer readable storage medium of claim 14, wherein the method further comprises determining the next polling time based on the prediction of when the operation-related event will occur and on network traffic.

16. The computer readable storage medium of claim 14, wherein the method further comprises determining the next polling time based on the prediction of when the operation-related event will occur and if another operation is executing with a higher priority than the operation being monitored.

17. The computer readable storage medium of claim 14, wherein the method further retains a status of the monitored operation for a period of time after completion of the operation.

18. The computer readable storage medium of claim 14, wherein the method further comprises adjusting the next polling time.

19. The computer readable storage medium of claim 14, wherein the method further comprises adjusting the next polling time based on the presence of a user input to the polling system.

20. The computer readable storage medium of claim 14, wherein the polling system is a client system and the monitored system is a data storage server.

* * * * *

UNITED STATES PATENT AND TRADEMARK OFFICE
CERTIFICATE OF CORRECTION

PATENT NO. : 7,631,076 B2
APPLICATION NO. : 10/801255
DATED : December 8, 2009
INVENTOR(S) : Cannon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1665 days.

Signed and Sealed this

Second Day of November, 2010

David J. Kappos
*Director of the United States Patent and Trademark Office*